US010930024B2

(12) United States Patent
Chen et al.

(10) Patent No.: US 10,930,024 B2
(45) Date of Patent: Feb. 23, 2021

(54) SYSTEM, METHOD AND NON-TRANSITORY COMPUTER READABLE MEDIUM FOR COLOR ADJUSTMENT (71) Applicant: Realtek Semiconductor Corporation, Hsinchu (TW)

(72) Inventors: Shu-Mi Chen, Hsinchu (TW); Wen-Tsung Huang, Chiayi (TW); Kai Liu, Taipei (TW)

(73) Assignee: REALTEK SEMICONDUCTOR CORPORATION, Hsinchu (TW)

(*) Notice: Subject to any disclaimer, the term of this patent is extended or adjusted under 35 U.S.C. 154(b) by 98 days.

(21) Appl. No.: 16/520,427

(22) Filed: Jul. 24, 2019

(65) Prior Publication Data

US 2020/0090376 A1    Mar. 19, 2020

(30) Foreign Application Priority Data

Sep. 18, 2018  (TW) .................................. 107132847

(51) Int. Cl.
*G06T 11/60* (2006.01)
*G06T 11/00* (2006.01)
*G06K 9/00* (2006.01)
*G06K 9/62* (2006.01)

(52) U.S. Cl.
CPC ........ *G06T 11/001* (2013.01); *G06K 9/00234* (2013.01); *G06K 9/6215* (2013.01); *G06T 11/60* (2013.01)

(58) Field of Classification Search
CPC .................. G06T 11/001; G06T 11/60; G06T 2207/10024; G06T 5/00–50; G06K 9/00234; G06K 9/6215
See application file for complete search history.

(56) References Cited

U.S. PATENT DOCUMENTS

| 7,733,033 | B2 * | 6/2010 | Baaijens | H05B 41/38 |
| | | | | 315/292 |
| 2008/0150946 | A1 * | 6/2008 | Kuo | G06T 7/13 |
| | | | | 345/442 |
| 2010/0110100 | A1 * | 5/2010 | Anandasivam | H04N 1/60 |
| | | | | 345/593 |
| 2013/0286040 | A1 * | 10/2013 | Kawaguchi | G06T 11/001 |
| | | | | 345/601 |

FOREIGN PATENT DOCUMENTS

| CN | 101123733 B | 5/2010 |
| CN | 101505432 B | 8/2011 |

* cited by examiner

*Primary Examiner* — Sean T Motsinger
(74) *Attorney, Agent, or Firm* — Locke Lord LLP; Tim Tingkang Xia, Esq.

(57) ABSTRACT

A color adjustment system includes a memory and a processor. The memory stores instructions. The processor is configured to access the instructions to perform the following: accessing an image; providing a control interface having control points distributed thereon, and the plurality of control points defines a plurality of areas on a color plane; in response to one of the control points being moved from a first location to a second location on the color plane, selecting adjusting areas adjacent to the first location, in order to redefine an original chroma in the adjusting areas to an adjusted chroma; and determining whether pixels of the image match the original chroma in the adjusting areas, and displaying the pixels with the adjusted chroma if the pixels are matched to the original chroma.

20 Claims, 10 Drawing Sheets

SYSTEM, METHOD AND NON-TRANSITORY COMPUTER READABLE MEDIUM FOR COLOR ADJUSTMENT

CROSS-REFERENCE TO RELATED APPLICATION

This application claims priority to Taiwan Application Serial Number 107132847, filed on Sep. 18, 2018, which is herein incorporated by reference.

BACKGROUND

Technical Field

Present disclosure relates to an electronic system, a control method and a non-transitory computer readable medium thereof. More particularly, the present disclosure relates to the system, the method and the non-transitory computer readable medium for color adjustment.

Description of Related Art

In prior arts, it is difficult for the color adjustment systems to provide intuitive user experiences other than the process of calculation. Besides, such color adjustment systems are mostly focused on global control but local control to the subject.

DETAILED DESCRIPTION

Figure 1:
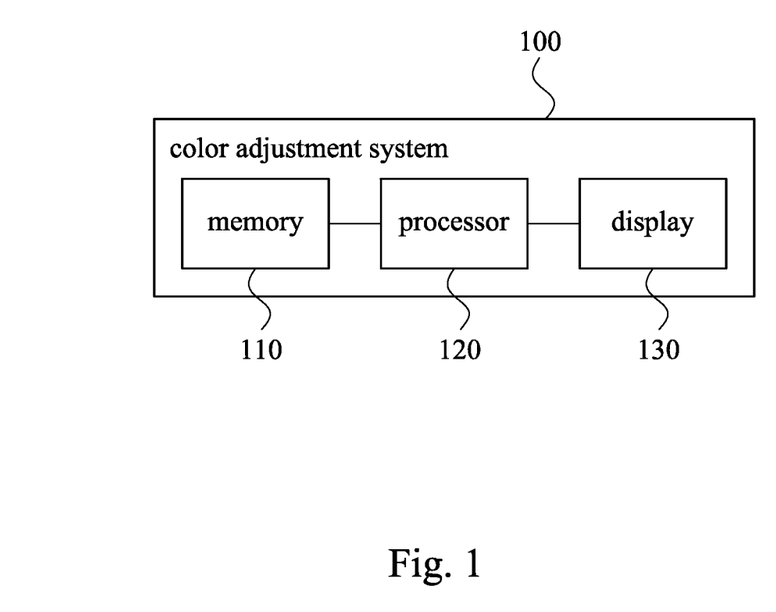
FIG. 1 is a schematic diagram showing a color adjustment system according to one embodiment of present disclosure.

FIG. 1 is a schematic diagram showing a color adjustment system according to one embodiment of present disclosure. In some embodiments, a color adjustment system 100 includes a memory 110 and a processor 120. The processor 120 may include, but not limited to, a single processing circuit or an integration of a plurality of microprocessors electrically coupled to the memory 100. The memory 110 may be a computer readable medium, including transitory and non-transitory internal/external memory.

In some embodiments, the processor 120 is configured to access at least one instruction, associated with a color adjustment method, from the memory 100. The processor 120 is configured to execute the at least one instruction to perform the color adjustment method. For better understandings of operations of the processor 120, the color adjustment method defined by the at least one instruction will be introduced in this document.

In some embodiments, the color adjustment system 100 further includes a display 130. The processor 120 may present images corresponding to executions of the color adjustment method to a user via the display 130.

It is noted that the configurations in above embodiment are for exemplary purpose but not to limit the scope of present disclosure. In some embodiments, the color adjustment system 100 may further include some input devices and output devices for the user to control the color adjustment system 100.

Figure 2:
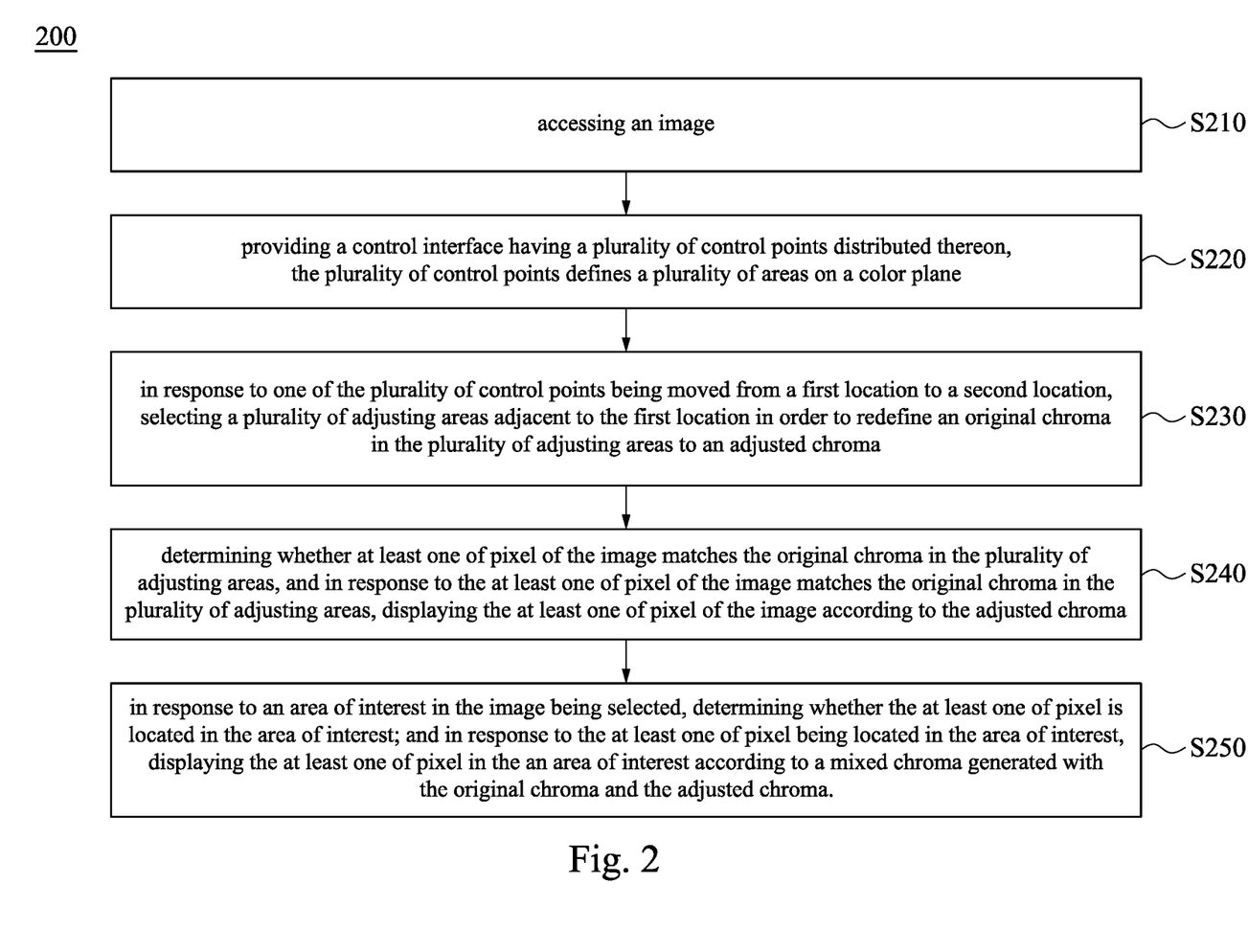
FIG. 2 is a flow chart illustrating a color adjustment method according to one embodiment of present disclosure.

FIG. 2 illustrates a flow chart according to one embodiment of the color adjustment method of present disclosure. In some embodiments, the color adjustment method 200 may be performed by the color adjustment system 100 shown in FIG. 1, and thus references may be made to the embodiment of FIG. 1 as well. In the embodiment, the steps of the color adjustment method performed by the color adjustment system 100 performs will be explained in the paragraphs below.

Step S210: accessing an image.

Figure 3:
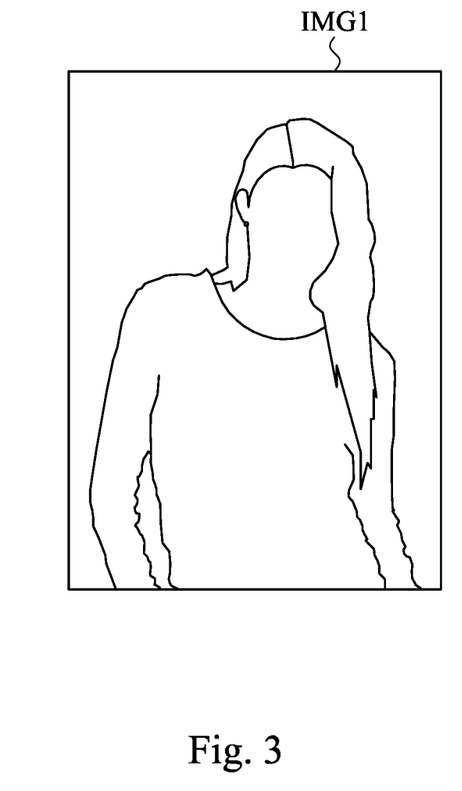
FIG. 3 is a schematic diagram illustrating an image according to one embodiment of present disclosure.

In some embodiments, as shown in FIG. 1, the processor 120 of the color adjustment system 100 may access at least one image from the memory 110 (or other memories) and show the at least one image via the display 130. For better understandings, references may be made to FIG. 3. FIG. 3 is a schematic diagram illustrating an image according to one embodiment of present disclosure. In some embodiments, the processor 120 may access the memory 110 for the image IMG1, then display the image IMG1 on the display 130. As shown in FIG. 3, the image IMG1 shows a person with a shirt on him/her.

Step S220: providing a control interface having a plurality of control points distributed thereon, the plurality of control points defines a plurality of areas on a color plane.

Figure 4:
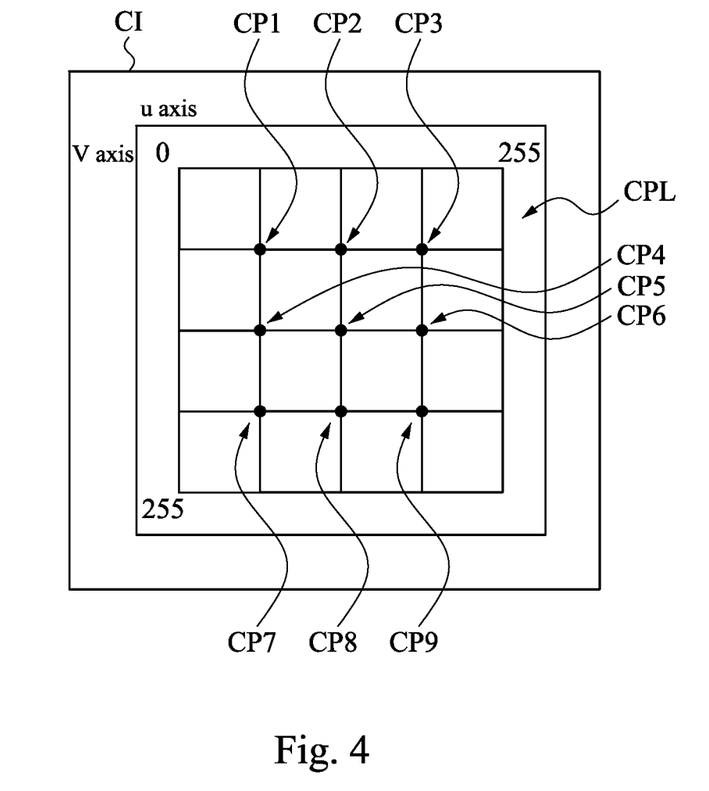
FIG. 4 is a schematic diagram illustrating a control interface according to one embodiment of present disclosure.

In some embodiments, as shown in FIG. 1, the processor 120 of the color adjustment system 100 may provide at least one control interface via the display 130. For better understandings, referring to FIG. 4. FIG. 4 is a schematic diagram illustrating a control interface according to one embodiment of present disclosure. As shown in FIG. 4, in some embodiments, the processor 120 may display a control interface CI via the display 130. The control interface CI shows a color plane CPL (i.e. a U-V color plane) in an initial state. The color plane CPL is provided in a coordinate system form. The coordinate system has a horizontal axis showing U vectors, ranging from 0-255, of the color plane CPL and a vertical axis showing V vectors, also ranging from 0-255, of the color plane CPL.

It is noted that, on the color plane CPL shown by the control interface CI, each coordinate point corresponds to a chroma. For instance, an origin of the color plane CPL (U: 0, V: 0) and an endpoint of the color plane CPL (U: 255, V: 255) are corresponding to two different chromas, respectively.

As shown in FIG. 4, under the initial state, there are nine control points CP1-CP9 arranged on the color plane CPL in a specific range. Each of the control points CP1-CP9 is located on one coordinate point of the color plane CPL. For example, as shown in FIG. 4, under the initial state, the specific range may be 64 units defined by the horizontal axis and the vertical axis of the color plane CPL.

That is to say, under the initial state, the control point CP1 is located at the coordinate point of (U: 63, V: 63), the control point CP2 is located at the coordinate point of (U:

127, V: 63), and the control point CP3 is located at the coordinate point of (U: 191, V: 63). It is noted that the coordinates of the rest of the control points CP4-CP9 may be understand in the same way and will not be listed here. As shown in FIG. 4, the control points CP1-CP9 distributed on the color plane CPL in the specific range divide the color plane CPL into 16 areas. The control points CP1-CP9 define the chromas of the coordinate points falling within these areas.

Step S230: in response to one of the plurality of control points being moved from a first location to a second location, selecting a plurality of adjusting areas adjacent to the first location in order to redefine an original chroma in the plurality of adjusting areas to an adjusted chroma.

Figure 5A:
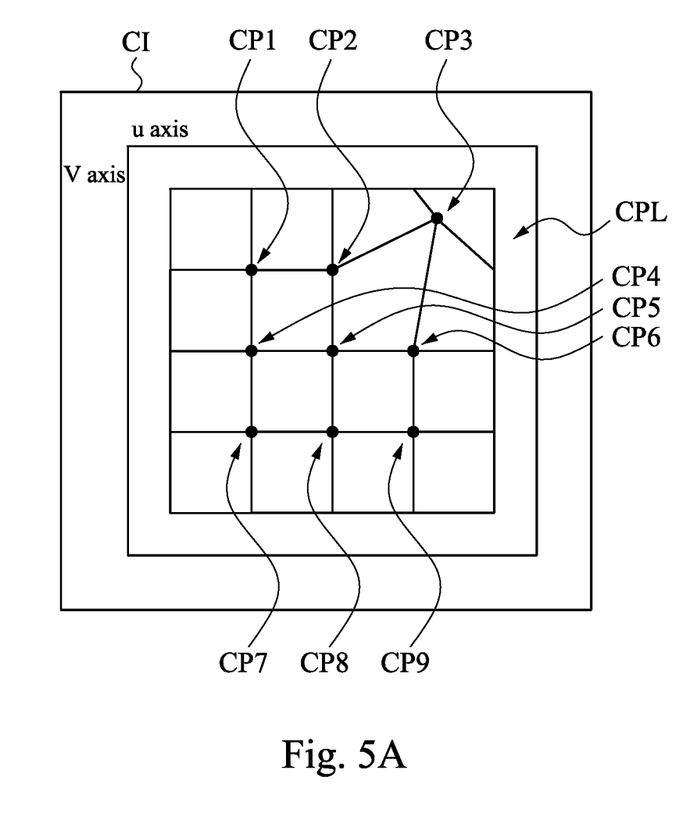
FIG. 5A is a schematic diagram showing a control interface according to one embodiment of present disclosure.

In some embodiments, the control points CP1-CP9 may be moved on the color plane CPL. For example, under a first operating state, the user may move at least one of the control points CP1-CP9 to other locations on the color plane CPL in order to control some chromas in the image. For better understandings, reference may be made to FIG. 5A. FIG. 5A is a schematic diagram showing a control interface according to one embodiment of present disclosure. In some embodiments, under the first operating state, the control point CP3 may be moved on the color plane CPL. Compare to the embodiments of FIG. 4, in some embodiments, the control point CP3 is moved to an upper-right location to where it was after the first operating state. In particular, the control point CP3 is moved from a coordinate point marked with (U: 191, V: 63) to another coordinate point marked with (U: 208, V: 30). The movement makes the original chroma of (U: 191, V: 63) being remapped to the adjusted chroma of (U: 208, V: 30). The remapping may bring some chroma changes to the image IMG1 as described below. However, it is understood that the U-V values corresponding to the original chroma and the adjusted chroma are for exemplary purposes but not to limit the scope of present disclosure.

Figure 5B:
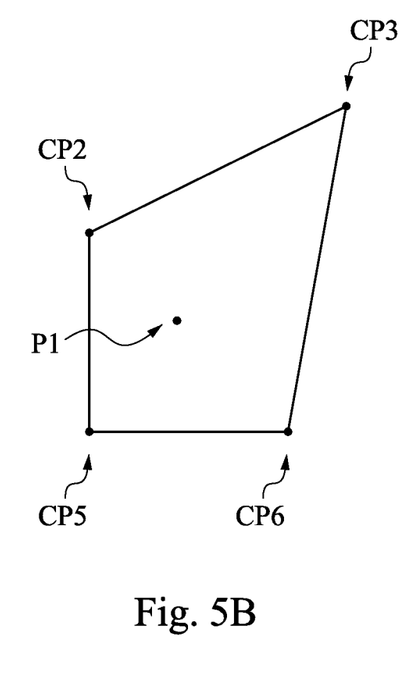
FIG. 5B, FIG. 5C and FIG. 6 are schematic diagrams illustrating a process of computation according to one embodiment of present disclosure.

In some embodiments, in response to the movement of the control point CP3, the original chromas falling within the four areas around the control point CP3 may be remapped to some adjusted chromas. The calculations of the adjusted chromas may be referred to those shown in FIG. 5B. FIG. 5B shows a schematic diagram of a bottom-left area with respect to the control point CP3 after the first operating state according to one embodiment of present disclosure. The control points CP2, CP3, CP5 and CP6 (i.e. the reference control points) on the color plane CPL may define the area shown in the figure. It is understood that the area was a rectangle as shown in the embodiment of FIG. 4. After the first operating state, the area became an irregular quadrilateral as shown in FIG. 5B. In some embodiments, after the first operating state, not only the control point CP3 but at least one of the control points CP2, CP5 and CP6 is moved. It is noted tha, after the first operating state, the chromas of the control points CP2, CP3, CP5 and CP6 are modified as adjusted chromas. If a control point is moved, its adjusted chroma is different from its original chroma. If a control point is kept, its adjusted chroma and original chroma are the same.

Each of the coordinate points (e.g. P1) falls within the area shown in FIG. 5B may has an adjusted chroma redefined by the control points CP2, CP3, CP5 and CP6. More specifically, the adjusted chroma of each coordinate point may be determined by the distances from itself to the surrounding control points under the initial state and the adjusted chromas of the surrounding control points after the first operating state. In an exemplary case of the coordinate point P1, it is assumed that the adjusted chroma of the coordinate point P1 may be presented as P1($u$, $v$), after the first operating state. It is assumed that, after the first operating state, the adjusted chroma control point CP2 may be presented as CP2($u$, $v$) and the adjusted chroma of the control point CP3 may be presented as CP3($u$, $v$). It is assumed that, after the first operating state, the adjusted chroma of the control point CP5 may be presented as CP5($u$, $v$) and the adjusted chroma of the control point CP6 may be presented as CP6($u$, $v$). In this case, the adjusted chroma of P1($u$, $v$) may be calculated according to the equation below.

P1($u$, $v$)=W2*CP2($u$, $v$)+W3*CP3($u$, $v$)+W5*CP5($u$, $v$)+W6*CP6($u$, $v$). In the equation, W2 represents a weigh corresponding to the chroma of the control point CP2. The value of W2 may be calculated by: (1−Dl/(Dl+Dr))*(1−Dt/(Dt+Db)).

Figure 5C:
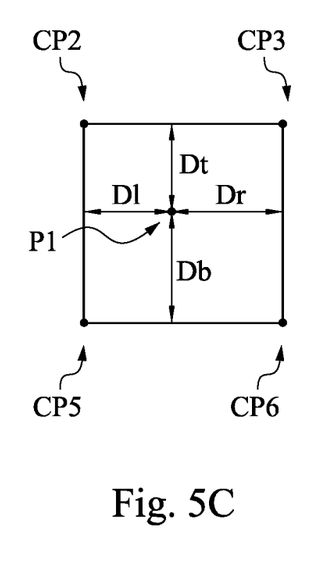

For better understandings, referring to FIG. 5C. FIG. 5C is a schematic diagram illustrating a process of computation according to one embodiment of present disclosure. For better understandings, FIG. 5C illustrates the horizontal distances and vertical distances from the coordinate point P1 to the surrounding control points CP2, CP3, CP5 and CP6 under the initial state. As shown in FIG. 5C, in this area, the control point CP2 is located at the upper-left of the coordinate point P1. In the calculation equation, Dl represents a horizontal distance from the coordinate point P1 to a line connecting the control point CP2 and the control point CP5 (i.e. the line shown at the left side of the area) under the initial state. Dr represents a horizontal distance from the coordinate point P1 to a line connecting the control point CP3 and the control point CP6 (i.e. the line shown at the right side of the area) under the initial state. Dt represents a vertical distance from the coordinate point P1 to a line connecting the control point CP2 and the control point CP3 (i.e. the line shown at the top side of the area) under the initial state. Db represents a vertical distance from the coordinate point P1 to a line connecting the control point CP5 and the control point CP6 (i.e. the line shown at the bottom side of the area) under the initial state.

In the same manner, W3 represents a weight of CP3 ($u$, $v$). The value of W3 may be calculated by an equation of: (1−Dr/(Dl+Dr))*(1−Dt/(Dt+Db)). Similarly, a value of W5 may be calculated by an equation of: (1−Dl/(Dl+Dr))*(1−Db/(Dt+Db)) and a value of W6 may be calculated by: (1−Dr/(Dl+Dr))*(1−Db/(Dt+Db)). That is to say, values of the weights W2, W3, W5 and W6 are determined by the distances from the coordinate point P1 to the control points CP2, CP3, CP5 and CP6 under the initial state, respectively.

As shown in FIG. 5C, when the control points are set at their original locations under the initial state, each coordinate point of the color plane CPL is corresponding to an original chroma. As shown in FIG. 5B, after the operating state, locations of the control points may be changed. On the color plane CPL, movements of the control points may change chromas of the coordinate point around the control point to adjusted chromas.

Figure 6:
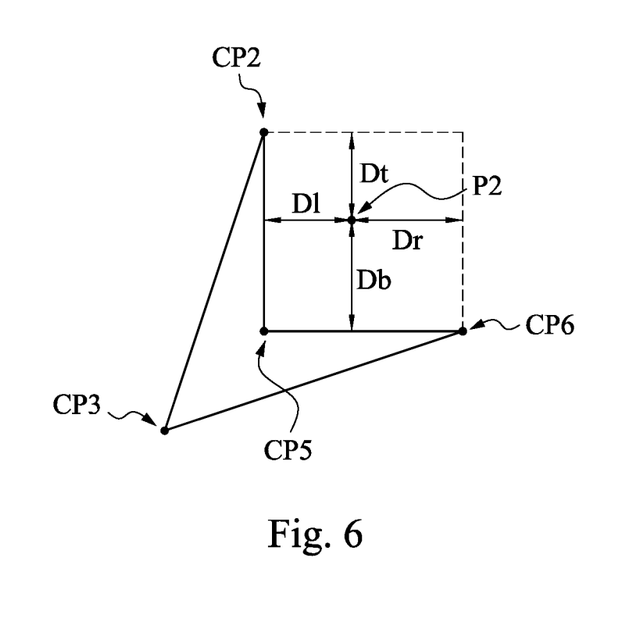

It is understood that each of the control points CP1-CP9 may be moved to other locations on the color plane CPL and the processor 120 may calculate the adjusted chromas of the coordinate points redefied by such movements. For better understandings, referring to FIG. 6. FIG. 6 is a schematic diagram illustrating a process of computation according to one embodiment of present disclosure. As shown in FIG. 6, in some embodiments, the control point CP3 is moved to bottom-left of the color plane CPL under the second operating state. FIG. 6 illustrates the modified areas redefined by the control points CP2, CP3, CP5 and CP6 on the color plane CPL after the second operating state. It is noted that, under the initial state, an adjusted chroma of the coordinate point P2 falling within the areas defined by the control points CP2, CP3, CP5 and CP6 may be calculated in a same manner as shown in the foregoing embodiments and will not be repeated here. In this embodiment, a significant movement is made to the control point CP3 so there would be significant differences between the coordinate points' adjusted chromas and the coordinate points' original chromas.

It is noted that, in the embodiment above, a case of the control point CP3 being moved is presented for exemplary purposes but not to limit the scope of present disclosure. In some embodiments, present disclosure is applicable to a case of more than one control points CP1-CP9 are moved. The adjusted chromas in such case may be calculated according to the way as presented in the embodiment above.

It is noted that each coordinate point on the color plane CPL may has several weights related to the surrounding coordinate points and the chromas of these coordinate points are defined according to the weights and the chromas of the surrounding coordinate points. The chroma calculation of these coordinate points is similar to the ways as shown in the embodiments above.

Step S240: determining whether at least one of pixel of the image matches the original chroma in the plurality of adjusting areas, and in response to the at least one of pixel of the image matching the original chroma in the plurality of adjusting areas, displaying the at least one of pixel of the image according to the adjusted chroma.

In some embodiments of the color adjustment system 100, the processor 120 may determine whether some pixels in the image have original chromas falling within the adjusting areas of the color plane CPL. If it is determined that the original chromas of some pixels fall within the adjusting areas, the processor 120 may present these pixels with the adjusted chroma. In other words, the processor 120 may replace the original chromas of such pixels corresponding to the adjusting areas by the adjusted chromas.

In one embodiment of FIG. 3, the processor 120 may connect to the memory 110 to access the image IMG1. In some embodiments, the processor 120 may display the control interface CI via the display 130 so that the chroma change corresponding to the movements of the control points on the color plane CPL may be presented to the user directly. It is noted that not only the color plane CPL but also the image IMG1 may be displayed on the control interface CI. In this arrangement, the user may view the chroma changes of some pixels in the image IMG1 through the control interface CI.

Figure 7A:
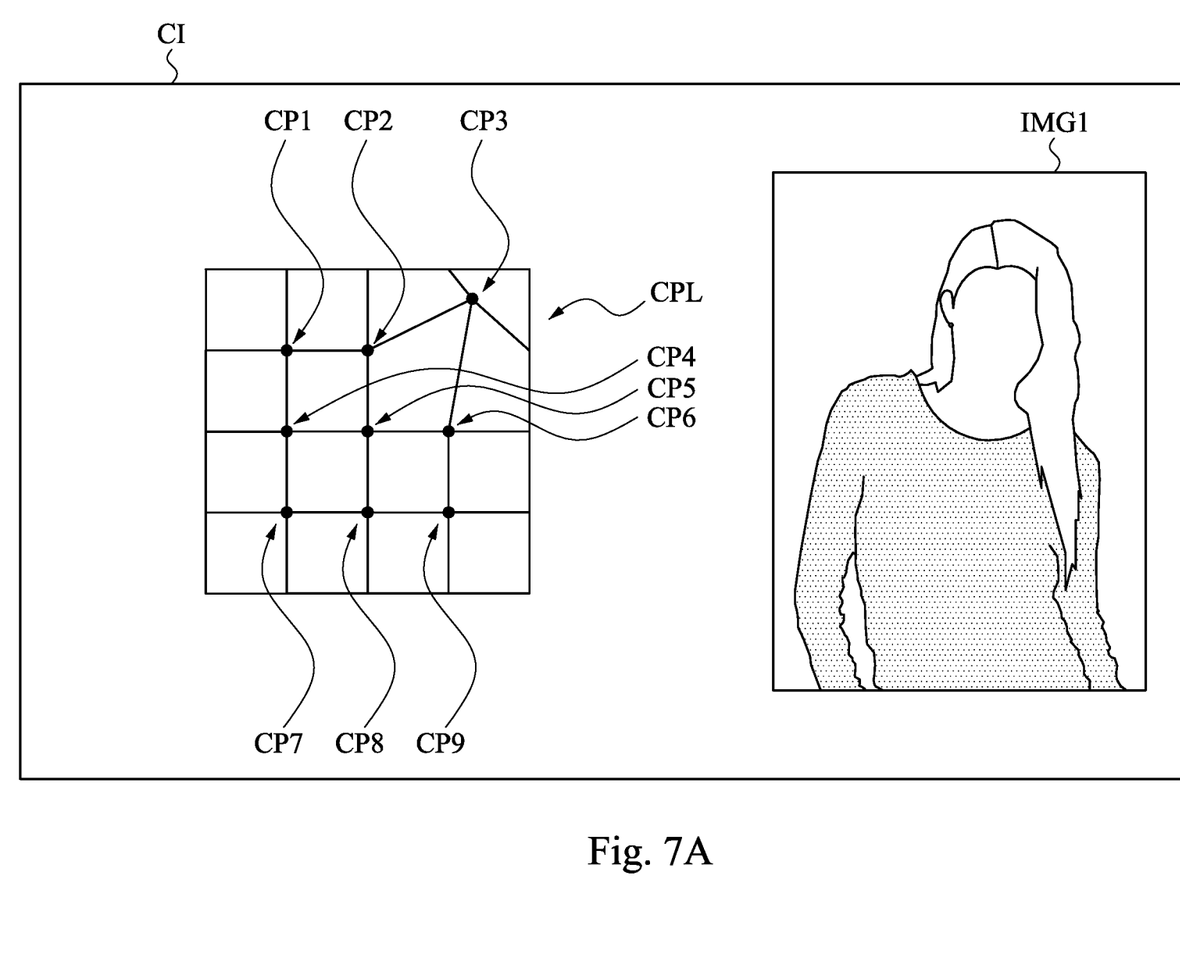
FIG. 7A, FIG. 7B and FIG. 8 are schematic diagrams of a control interface according to some embodiments of present disclosure.
Figure 7B:
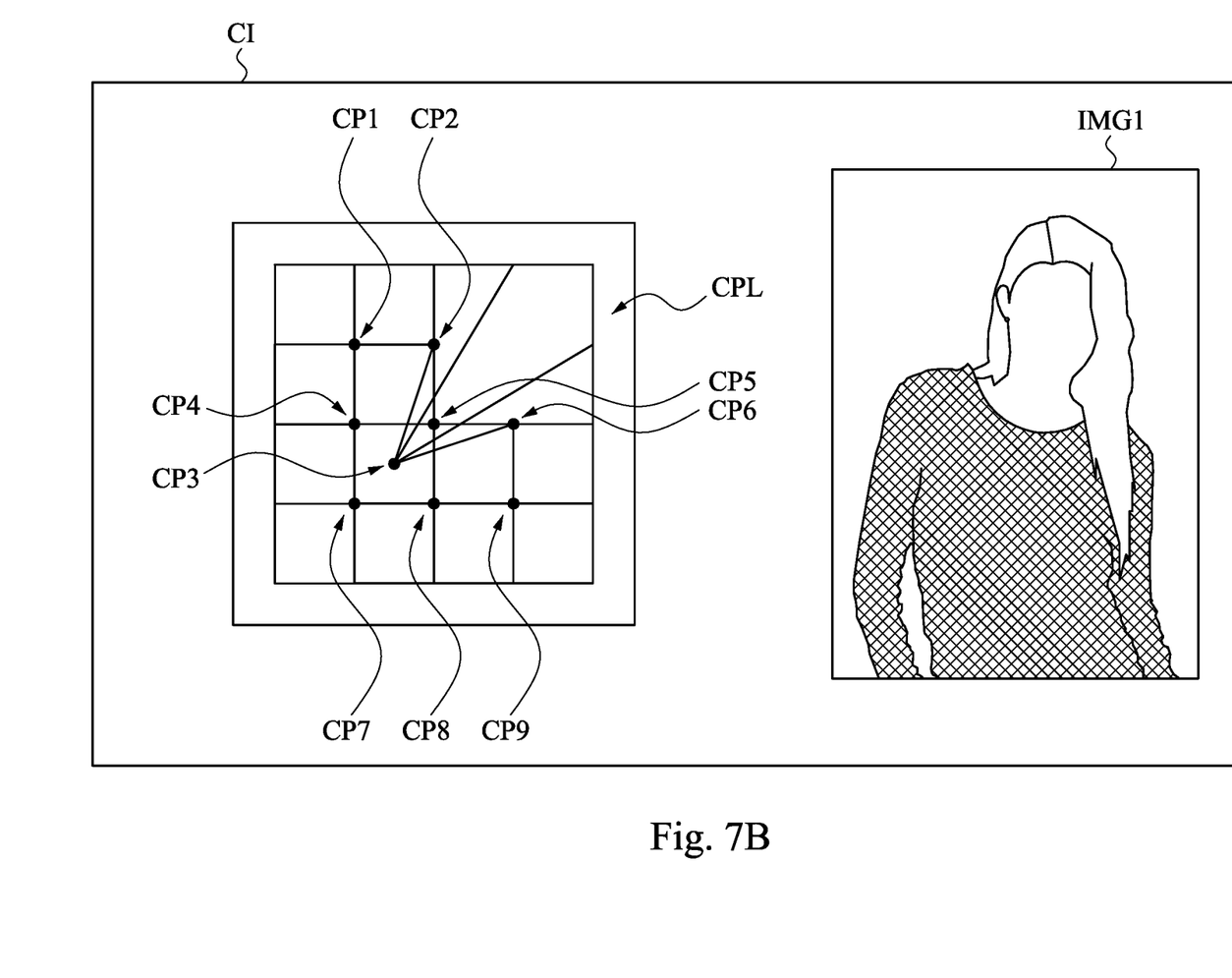

For better understandings, references are made to FIG. 7A and FIG. 7B, which are schematic diagrams of a control interface according to some embodiments of present disclosure. FIG. 7A is related to the embodiments of FIG. 5A-5C and FIG. 7B is related to the embodiments of FIG. 6. If the shirt of the person in the image IMG1 has a color corresponding to a chroma falling within the areas defined by the control points CP2, CP3, CP5 and CP6 on color plane CPL under the initial state, the processor 120 may display the shirt with the adjusted chroma after the first operating state or the second operating state. As shown in FIG. 7A and FIG. 7B, the colors that the person wears are different among these figures of the image IMG1.

Step S250: in response to an area of interest in the image being selected, determining whether the at least one of pixel is located in the area of interest; and in response to the at least one of pixel being located in the area of interest, displaying the at least one of pixel in the an area of interest according to a mixed chroma generated with the original chroma and the adjusted chrome.

In some embodiments, the control interface CI displayed on the display 130 includes a color plane CPL and an image IMG1. Through the control interface CI, the user may define areas of interest with specific sizes or specific shapes. The processor 120 may determine if there is any pixel of the images selected by the area of interest has an original chroma falls within the areas defined by the control points CP2, CP3, CP5 and CP6 on the color plane CPL, in the initial state. If it is determined that such pixel existed, the processor 120 may perform the color adjustment process only to the pixels within the area of interest. That is, the selection of the area of interest may be used to focus the color adjustment process to some particular areas instead of the entire image IMG1. For better understandings, reference may be made to FIG. 8. In some embodiments, the processor 120 may display the control interface CI via the display 130. On the control interface CI, an octagon-shaped selection frame SF is applied to the image IMG1 to define an area of interest.

Figure 8:
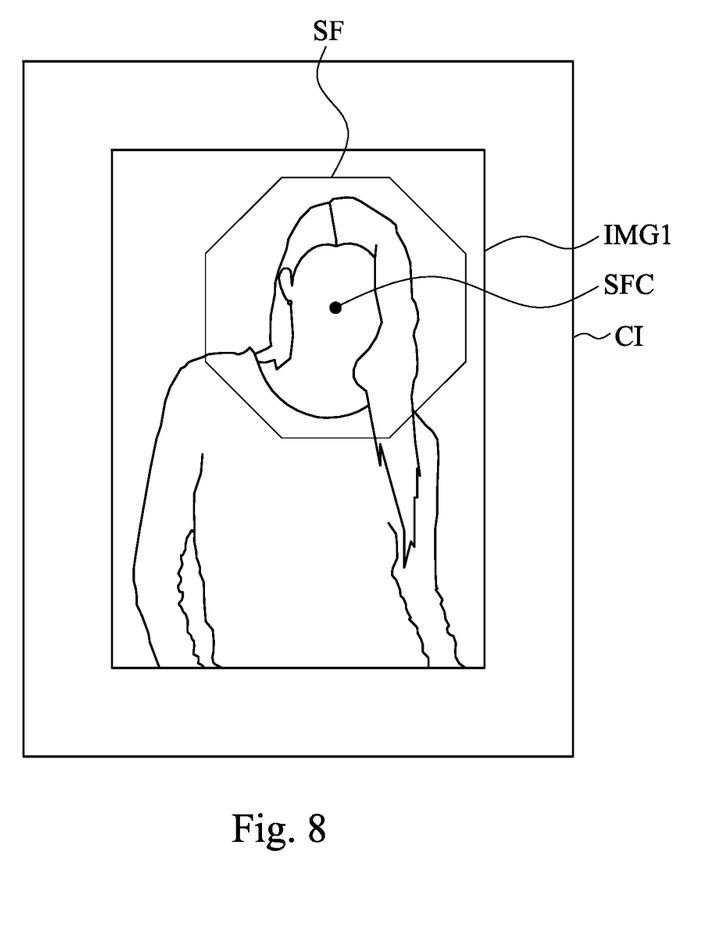

In some embodiments, the processor 120 may define a selection frame SF corresponding to the area of interest on the image IMG1 based on face detection logics. That is, the area of interest may be a face of the person in the image. In such configuration, the processor 120 may only adjust (or enhance) the chromas corresponding to the person's face instead of the noises in the image.

In some embodiments, the processor 120 may determine if there is selection frame SF corresponding to the area of interest being selected. The processor 120 may further determine whether some pixels selected by the selection frame SF having chromas falling within the areas defined by the control points CP2, CP3, CP5 and CP6 on the color plane CPL in the initial state. If such pixels existed, the processor 120 may generate a mixed chroma generated by the original chroma and the adjusted chroma according to a distance weight and display such pixels in the selection frame SF with the mixed chroma. It is noted that the distance weight is determined by distances from the pixels being detected to a center of the area of interest. As shown in FIG. 8, the selection frame SF has a center SFC. In some embodiments, if it is determined that the distance from such pixel to the center SFC is shorter, the distance weight corresponding to the adjusted chroma is larger and the distance weight corresponding to the original chroma is smaller. In this case, the mixed chroma is considered closer to the adjusted chroma. However, it is noted that the configuration of present disclosure is not limited thereto. Alternative configurations of the distance weight are possible.

In the embodiment shown above, the control points CP1-CP9 are distributed on the color plane CPL in a fixed range to divide the color plane CPL into 16 substantially even areas. However, it is understood that the scope of present disclosure is not limited thereto. In some embodiments, there may be different numbers of control points distributed on the color plane CPL in variable ranges, so that the color plane CPL may be divided into areas according to such control points.

Figure 9A:
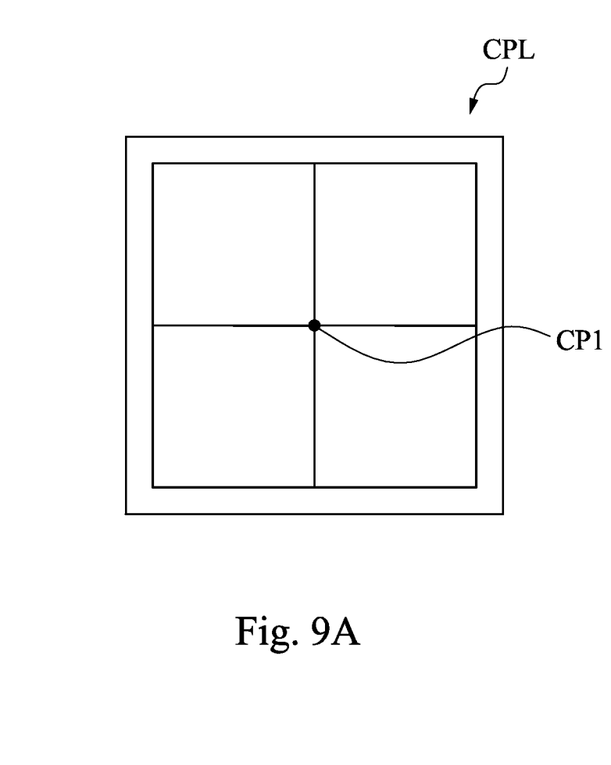
FIG. 9A and FIG. 9B are schematic diagrams of a color plane according to some embodiments of present disclosure.
Figure 9B:
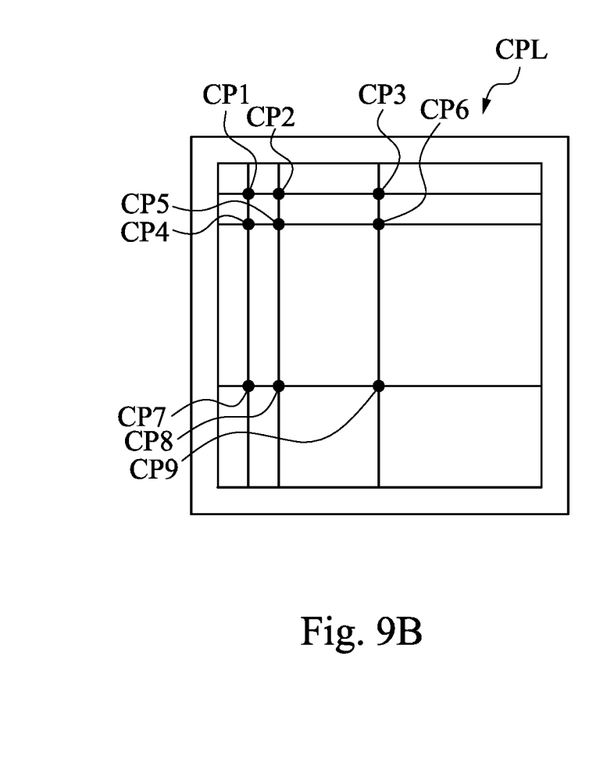

For better understandings, reference can be made to FIG. 9A and FIG. 9B. In some embodiments, as shown in FIG. 9A, there is a single control point CP1 divides the area of the color plane CPL into 4 equal parts. In some embodiments, as shown in FIG. 9B, the control points CP1-CP9 are unevenly arranged on the color plane CPL so that the area of the color plane CPL is divided into 16 different parts. In such configuration, color adjustment may be focused on some particular areas without adding more control points onto the chroma plane and it saves hardware resources.

According to foregoing embodiments, the color adjustment system, method and non-transitory computer readable medium of embodiments of the present disclosure provide an effective and intuitive approach for a user to adjust/enhance some chromas in the image.

What is claimed is:

1. A color adjustment system, comprising:
   a memory, configured to store at least one instruction; and
   a processor, coupled to the memory, the processor configured to access and execute the at least one instruction to perform the following:
   accessing an image;
   providing a control interface having a plurality of control points distributed thereon, wherein the plurality of control points define a plurality of areas on a color plane;
   in response to one of the plurality of control points being moved from a first location to a second location, selecting a plurality of adjusting areas adjacent to the first location, in order to redefine an original chroma in the plurality of adjusting areas to an adjusted chroma; and
   determining whether at least one of pixel of the image matches the original chroma in the plurality of adjusting areas, and in response to the at least one of pixel of the image matching the original chroma in the plurality of adjusting areas, displaying the at least one of pixel of the image according to the adjusted chroma.

2. The color adjustment system of claim 1, wherein the processor is further configured to access and execute the at least one instruction to perform the following:
   in response to an area of interest in the image being selected, determining whether the at least one of pixel is located in the area of interest; and
   in response to the at least one of pixel being located in the area of interest, displaying the at least one of pixel in the area of interest according to a mixed chroma generated with the original chroma and the adjusted chroma.

3. The color adjustment system of claim 2, wherein the processor is further configured to access and execute the at least one instruction to perform the following:
   mixing the original chroma and the adjusted chroma according to a distance weight in order to generate the mixed chroma, wherein the distance weight corresponds to a distance between the at least one pixel and a center of the area of interest.

4. The color adjustment system of claim 2, wherein a shape of the area of interest is an octagon.

5. The color adjustment system of claim 2, wherein the processor is further configured to access and execute the at least one instruction to perform the following:
   selecting the area of interest in the image according to a face detection logic.

6. The color adjustment system of claim 1, wherein the first location is adjacent to a plurality of reference control points in the plurality of control points on the color plane, and the adjusted chroma is determined according to the second location and at least three of the plurality of reference control points.

7. The color adjustment system of claim 1, wherein the plurality of control points are arranged on the color plane according a fixed range, in order to define the plurality of areas.

8. The color adjustment system of claim 1, wherein the plurality of control points are arranged on the color plane according a variable range in order to define the plurality of areas.

9. A color adjustment method, performed by a processor according to at least one instruction, the color adjustment method comprising:
   accessing an image;
   providing a control interface having a plurality of control points distributed thereon, the plurality of control points defines a plurality of areas on a color plane;
   in response to one of the plurality of control points being moved from a first location to a second location, selecting a plurality of adjusting areas adjacent to the first location in order to redefine an original chroma in the plurality of adjusting areas to an adjusted chroma; and
   determining whether at least one of pixel of the image matches the original chroma in the plurality of adjusting areas,
   and in response to the at least one of pixel of the image matches the original chroma in the plurality of adjusting areas, displaying the at least one of pixel of the image according to the adjusted chroma.

10. The color adjustment method of claim 9, further comprising:
    in response to an area of interest in the image being selected, determining whether the at least one of pixel is located in the area of interest; and
    in response to the at least one of pixel being located in the area of interest, displaying the at least one of pixel in the area of interest according to a mixed chroma generated with the original chroma and the adjusted chroma.

11. The color adjustment method of claim 10, further comprising:
    mixing the original chroma and the adjusted chroma according to a distance weight, in order to generate the mixed chroma, wherein the distance weight corresponds to a distance between the at least one pixel and a center of the area of interest.

12. The color adjustment method of claim 10, wherein a shape of the area of interest is an octagon.

13. The color adjustment method of claim 10, further comprising:
    selecting the area of interest in the image according to a face detection logic.

14. The color adjustment method of claim 9, wherein the first location is adjacent to a plurality of reference control points of the plurality of control points on the color plane, and the adjusted chroma is determined by the second location and at least three of the plurality of reference control points.

15. The color adjustment method of claim 9, wherein the plurality of control points are arranged on the color plane according a fixed range in order to define the plurality of areas.

16. The color adjustment method of claim 9, wherein the plurality of control points are arranged on the color plane according a variable range, in order to define the plurality of areas.

17. A non-transitory computer readable medium, associated with at least one instruction that defines a color adjustment method, in which the color adjustment method comprising:
    accessing an image;

providing a control interface having a plurality of control points distributed thereon, the plurality of control points defines a plurality of areas on a color plane;

in response to one of the plurality of control points being moved from a first location to a second location, selecting a plurality of adjusting areas adjacent to the first location, in order to redefine an original chroma in the plurality of adjusting areas to an adjusted chroma; and determining whether at least one of pixel of the image matches the original chroma in the plurality of adjusting areas, and in response to the at least one of pixel of the image matching the original chroma in the plurality of adjusting areas, displaying the at least one of pixel of the image according to the adjusted chroma.

18. The non-transitory computer readable medium of claim 17, wherein the color adjustment method further comprising:

in response to an area of interest in the image being selected, determining whether the at least one of pixel is located in the area of interest; and in response to the at least one of pixel being located in the area of interest, displaying the at least one of pixel in the area of interest according to a mixed chrome generated with the original chroma and the adjusted chrome.

19. The non-transitory computer readable medium of claim 18, wherein the color adjustment method further comprising:

mixing the original chroma and the adjusted chroma according to a distance weight in order to generate the mixed chroma, wherein the distance weight is corresponding to a distance between the at least one pixel and a center of the area of interest.

20. The non-transitory computer readable medium of claim 17, wherein the first location is adjacent to a plurality of reference control points of the plurality of control points on the color plane, and the adjusted chroma is determined by the second location and at least three of the plurality of reference control points.

* * * * *